(12) United States Patent
Gallaher et al.

(10) Patent No.: US 11,733,529 B1
(45) Date of Patent: Aug. 22, 2023

(54) LOAD-DISTRIBUTING HEADBAND FOR HEAD-MOUNTED DEVICE

(71) Applicants: Andrew Gallaher, Sunnyvale, CA (US); Samuel G. Smith, San Francisco, CA (US); Trevor J. Ness, Santa Cruz, CA (US)

(72) Inventors: Andrew Gallaher, Sunnyvale, CA (US); Samuel G. Smith, San Francisco, CA (US); Trevor J. Ness, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/194,798

(22) Filed: Mar. 8, 2021

Related U.S. Application Data

(60) Provisional application No. 63/012,946, filed on Apr. 21, 2020.

(51) Int. Cl.
*G09G 5/00* (2006.01)
*G02B 27/01* (2006.01)

(52) U.S. Cl.
CPC ..... *G02B 27/0176* (2013.01); *G02B 27/0172* (2013.01); *G02B 2027/0154* (2013.01)

(58) Field of Classification Search
CPC ............ G02B 27/0176; G02B 27/0172; G02B 2027/0154
USPC ........................................................... 345/8
See application file for complete search history.

(56) References Cited

U.S. PATENT DOCUMENTS

| | | | |
|---|---|---|---|
| 2,882,896 A * | 4/1959 | Seeler ................... | A62B 18/04 128/201.24 |
| 5,815,126 A | 9/1998 | Fan et al. | |
| 9,938,646 B2 * | 4/2018 | Hamada ................ | D03D 3/005 |
| 10,022,625 B2 | 7/2018 | Black et al. | |
| 2012/0306725 A1 * | 12/2012 | Hilkes ..................... | G09G 5/00 345/8 |
| 2016/0044981 A1 | 2/2016 | Frank et al. | |
| 2016/0054570 A1 * | 2/2016 | Bosveld ............ | G02B 27/0176 2/209.3 |
| 2016/0370590 A1 * | 12/2016 | Fujishiro ............ | G02B 27/0176 |
| 2018/0164594 A1 * | 6/2018 | Lee ....................... | G02B 27/017 |
| 2018/0180894 A1 * | 6/2018 | Pombo ................... | G06F 1/163 |
| 2018/0203240 A1 | 7/2018 | Jones et al. | |
| 2019/0110039 A1 * | 4/2019 | Linde .................... | H04N 5/232 |

(Continued)

FOREIGN PATENT DOCUMENTS

| | | |
|---|---|---|
| CN | 206224049 U | 6/2017 |
| CN | 207817306 U | 9/2018 |
| CN | 107076997 B | 8/2019 |

*Primary Examiner* — Jonathan M Blancha
(74) *Attorney, Agent, or Firm* — Young Basile Hanlon & MacFarlane, P.C.

(57) ABSTRACT

A head-mounted device includes a device housing and a facial interface. The facial interface has an upper portion and a lower portion. A headband is connected to a first lateral side and a second lateral side of the device housing and extends around a head of a user to support the device housing with respect to the user. The headband is configured to apply a moment to the device housing in a direction that urges the upper portion of the facial interface toward a head of user so that a first loading that is applied to the head of the user by the upper portion of the facial interface is higher than a second loading that is applied to the head of the user by the lower portion of the facial interface.

19 Claims, 11 Drawing Sheets

(56) References Cited

U.S. PATENT DOCUMENTS

2019/0141847 A1\* 5/2019 Chang ................. H05K 5/0086
2019/0243145 A1\* 8/2019 Ellis ................... G02B 27/0176

\* cited by examiner

LOAD-DISTRIBUTING HEADBAND FOR HEAD-MOUNTED DEVICE

CROSS-REFERENCE TO RELATED APPLICATIONS

This application claims the benefit of U.S. Provisional Application No. 63/012,946, filed on Apr. 21, 2020, the content of which is hereby incorporated by reference in its entirety for all purposes.

FIELD

The present disclosure relates generally to the field of head-mounted devices.

BACKGROUND

Computer-generated reality experiences are typically displayed to a user by a device that is worn on the user's head. These devices typically include a housing the supports the components that display the computer-generated reality content. Headband-type support structures are typically used to hold the device on the user's head.

SUMMARY

One aspect of the disclosure is a head-mounted device that is configured to display content to a user. The head-mounted device includes a device housing that has a first lateral side and a second lateral side and a facial interface that is associated with the device housing and is configured to contact a head of the user. The facial interface has an upper portion and a lower portion. A headband is connected to the first lateral side and the second lateral side of the device housing and extends around a head of the user to support the device housing with respect to the user. The headband is configured to apply a moment to the device housing in a direction that urges the upper portion of the facial interface toward a head of user so that a first loading that is applied to the head of the user by the upper portion of the facial interface is higher than a second loading that is applied to the head of the user by the lower portion of the facial interface.

In some implementations of the head-mounted device, at least part of the headband is elastic and flexible, is movable between an unstretched condition and a stretched condition, and includes an upper headband portion and a lower headband portion, wherein the upper headband portion has a lower elasticity than the lower headband portion.

In some implementations of the head-mounted device, at least part of the headband is elastic and flexible, is movable between an unstretched condition and a stretched condition, and the headband is curved in the unstretched condition so that an upper headband portion stretches by a first amount in the stretched condition, a lower headband portion stretches by a second amount in the stretched condition, wherein the first amount is greater than the second amount.

In some implementations of the head-mounted device, the headband includes a first pivot joint near the first lateral side of the device housing and a second pivot joint near the second lateral side of the device housing, wherein the first pivot joint and the second pivot joint are spring-biased to apply the moment to the device housing.

In some implementations of the head-mounted device, the headband includes a first pivot joint near the first lateral side of the device housing and a second pivot joint near the second lateral side of the device housing, wherein the first pivot joint and the second pivot joint each include an electronic actuator to apply the moment to the device housing.

The head-mounted device may also include electronic components that are connected to the device housing and optical components that are connected to the device housing, wherein the electronic components and the optical components cooperate to display the content to the user.

Another aspect of the disclosure is a head-mounted device that is configured to display content to a user, The device includes a device housing that has a first lateral side and a second lateral side and a headband that is connected to the first lateral side and the second lateral side of the device housing and extends around a head of the user to support the device housing with respect to the user. The headband includes an upper headband portion that is elastic and flexible, the headband includes a lower headband portion that is elastic and flexible, and the upper headband portion has a lower elasticity than the lower headband portion.

The upper headband portion and the lower headband portion may be included in a one-piece structure. The upper headband portion and the lower headband portion may be separate structures.

The upper headband portion may have a larger cross-sectional area than the lower headband portion.

The head-mounted device may include a facial interface that is associated with the device housing and is configured to contact a head of the user, wherein the facial interface has an upper portion and a lower portion and a first loading that is applied to the head of the user by the upper portion of the facial interface is higher than a second loading that is applied to the head of the user by the lower portion of the facial interface.

The upper headband portion and the lower headband portion may be movable between an unstretched condition and a stretched condition.

The head-mounted device may include electronic components that are connected to the device housing and optical components that are connected to the device housing, wherein the electronic components and the optical components cooperate to display the content to the user.

Another aspect of the disclosure is a head-mounted device that is configured to display content to a user. The head-mounted device includes a device housing that has a first lateral side and a second lateral side and a headband that is connected to the first lateral side and the second lateral side of the device housing and extends around a head of the user to support the device housing with respect to the user. At least part of the headband is elastic and flexible and is movable between an unstretched condition and a stretched condition. The headband is curved in the unstretched condition so that an upper headband portion stretches by a first amount in the stretched condition and a lower headband portion stretches by a second amount in the stretched condition, wherein the first amount is greater than the second amount.

The head-mounted device may include a facial interface that is associated with the device housing and is configured to contact a head of the user, wherein the facial interface has an upper portion and a lower portion and a first loading that is applied to the head of the user by the upper portion of the facial interface is higher than a second loading that is applied to the head of the user by the lower portion of the facial interface.

The head-mounted device may include electronic components that are connected to the device housing and optical components that are connected to the device housing, wherein the electronic components and the optical components cooperate to display the content to the user.

Another aspect of the disclosure is a head-mounted device that is configured to display content to a user. The head-mounted device includes a device housing that has a first lateral side and a second lateral side. The head-mounted device also includes a headband that includes a central portion, a first end portion, a second end portion, a first pivot joint, and a second pivot joint. The first end portion is connected to the first lateral side of the device housing and to the first pivot joint, the second end portion is connected to the second lateral side of the device housing and to the second pivot joint, and the central portion is connected to the first pivot joint and the second pivot joint. The first pivot joint is configured to urge the first end portion of the headband and the central portion of the headband to rotate upward and toward each other and the second pivot joint is configured to urge the second end portion of the headband and the central portion of the headband to rotate upward and toward each other.

The head-mounted device may also include a facial interface that is associated with the device housing and is configured to contact a head of the user, wherein the facial interface has an upper portion and a lower portion and a first loading that is applied to the head of the user by the upper portion of the facial interface is higher than a second loading that is applied to the head of the user by the lower portion of the facial interface.

The first pivot joint and the second pivot joint may be spring-biased.

The first pivot joint and the second pivot joint may each include a guide plate that defines detent positions. The guide plate of each of the first pivot joint and the second pivot joint may define a sliding motion of the first end portion of the headband and the second end portion of the headband relative to the central portion of the headband.

The first pivot joint and the second pivot joint may each include a first housing part, a second housing part, a biasing structure, and a connecting structure, wherein the first housing part is positioned longitudinally forward relative to the second housing part, the biasing structure is configured to urge relative rotation of the first housing part and the second housing part, and the connecting structure defines a rotation point for the first pivot joint.

The first pivot joint and the second pivot joint may each include an electronic actuator to urge rotation of the first end portion, the second end portion, and the central portion of the headband.

The electronic actuator of each of the first pivot joint and the second pivot joint may be controlled according to sensor output signals.

The head-mounted device may also include electronic components that are connected to the device housing and optical components that are connected to the device housing, wherein the electronic components and the optical components cooperate to display the content to the user.

DETAILED DESCRIPTION

The disclosure herein relates to head-mounted devices that are used to show computer-generated reality (CGR) content to users. Head-mounted devices often include a device housing that is positioned near the eyes of the user and a support structure that holds the device housing in place. The self-weight of the device housing may cause the device housing to tend to rotate so that a lower part of the device housing applies a higher loading to the user's face than an upper part does. This loading may be applied through a facial interface of the device housing that is often made of foam.

The head-mounted devices that are described herein include headbands that are configured to apply a moment to the device housing in a direction that is contrary to a moment that is applied by the self-weight of the device housing. The result is that the loading applied to the user's face through a lower part of the device housing (e.g., a lower portion of a facial interface) is decreased in favor of an increased loading that is applied through an upper part of the device housing (e.g., an upper portion of a facial interface). This may be accomplished using components that are incorporated in the headband that encircles the user's head, and may avoid added components such as a strap that extends in a front-to-rear direction over the user's head.

Figure 1:
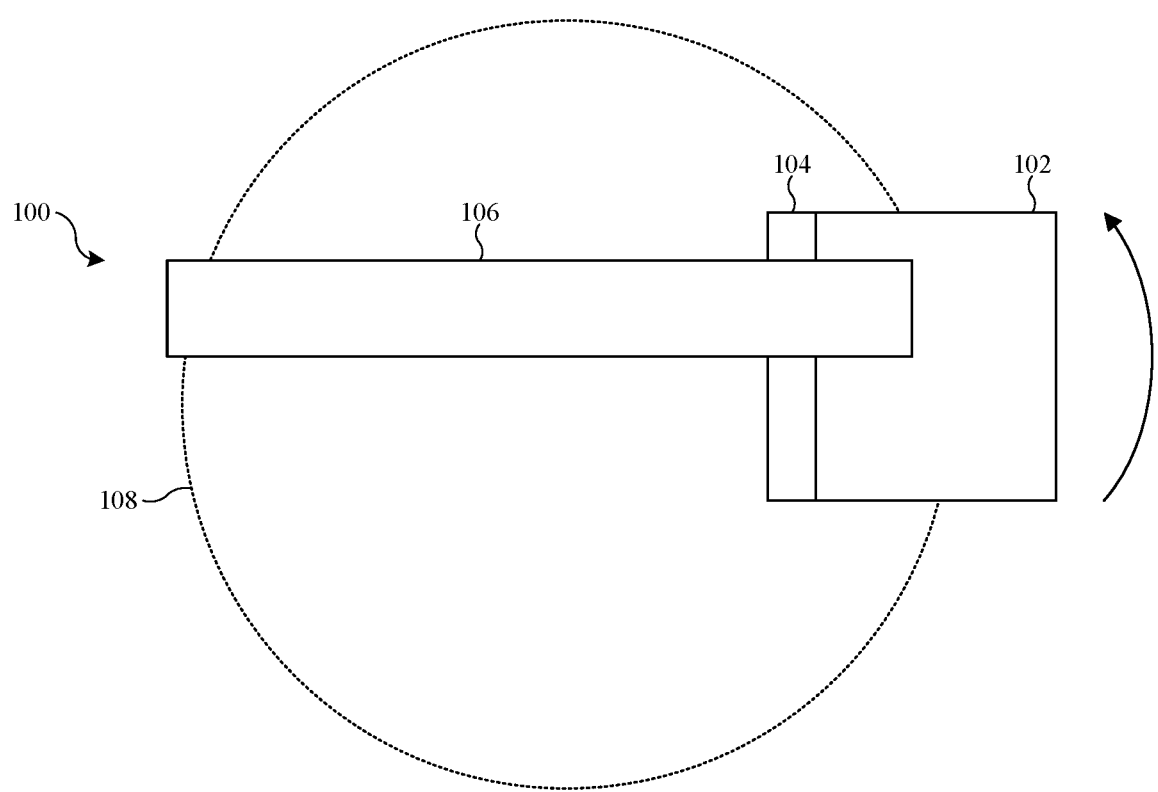
FIG. 1 is a side view illustration that shows a head-mounted device.
Figure 2:
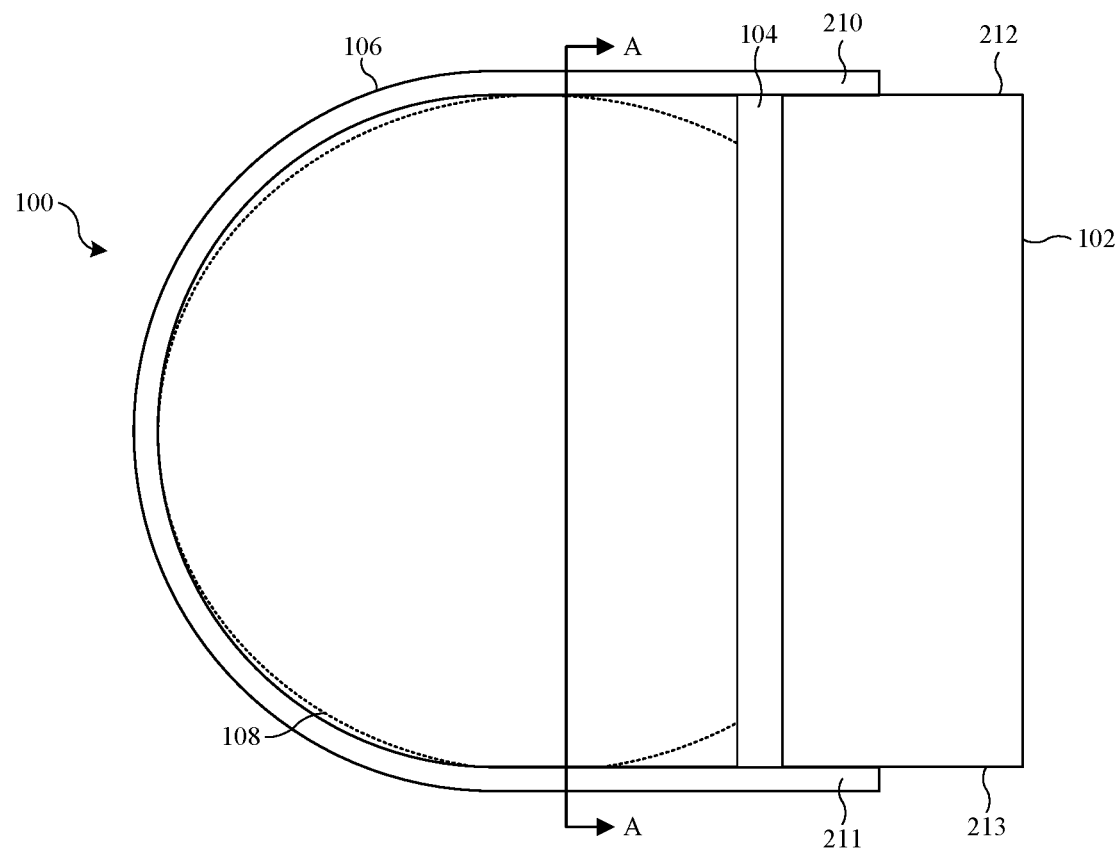
FIG. 2 is a top view illustration that shows the head-mounted device.
Figure 3:
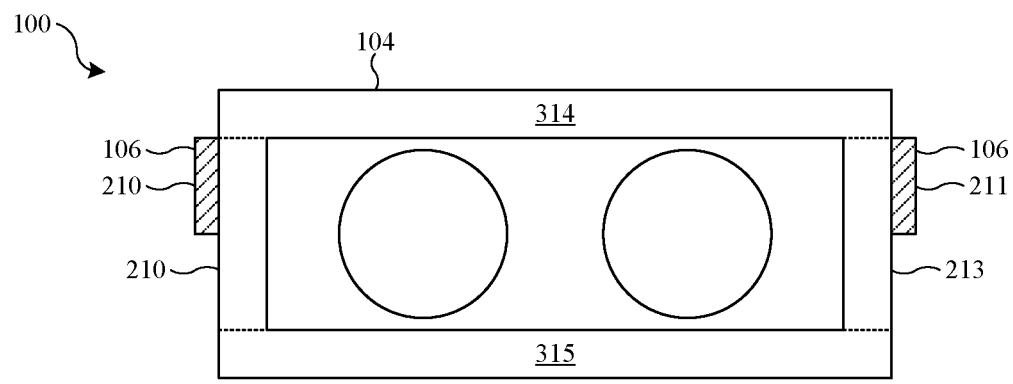
FIG. 3 is an illustration taken along line A-A of FIG. 2 that shows the head-mounted device.

FIG. 1 is a side view illustration that shows a head-mounted device 100. FIG. 2 is a top view illustration that shows the head-mounted device 100. FIG. 3 is an illustration taken along line A-A of FIG. 2 that shows the head-mounted device 100.

The head-mounted device 100 is intended to be worn on the head of a user and includes components that are configured to display content to the user, such as electronic components and optical components as will be described further herein. Components that are included in the head-mounted device 100 may be configured to track motion of parts of the user's body, such as the user's head and hands. Motion tracking information that is obtained by components of the head-mounted device can be utilized as inputs that control aspects of the generation and display of the content to the user, so that the content displayed to the user can be part of a CGR experience in which the user is able to view and interact with virtual environments and virtual objects. As will be explained further herein, CGR experiences include display of computer-generated content independent of the surrounding physical environment (e.g., virtual reality), and display of computer generated content that is overlaid relative to the surrounding physical environment (e.g., augmented reality).

In the illustrated example, the head-mounted device 100 includes a device housing 102, a facial interface 104, and a headband 106. The headband 106 is configured so that a moment (i.e., moment of force, torque, rotational force) is applied to the device housing 102 in a direction that urges an upper portion of the device housing 102 toward a head 108 of a user (e.g., toward the user's forehead) and urges a lower portion of the device housing 102 away from the head 108 of the user (e.g., away from the user's nose and cheeks. As a result of the moment applied to the device housing 102, the lower portion of the device housing 102 may remain engaged with the head 108 of the user (e.g., the user's nose and cheeks) but the loading changes so that a larger loading is applied to the head 108 of the user by the upper portion of the device housing 102 and a smaller loading is applied to the head 108 of the user by the lower portion of the device housing 102.

The device housing 102 is a structure that supports various other components that are included in the head-mounted device 100. The device housing 102 may have a size and shape that corresponds generally to the width of the head 108 of the user (e.g., the head of an average person). The device housing 102 may have a height that corresponds generally to a distance between forehead and cheek bones such that it extends above and below an average fuser's orbital cavities when worn. In one implementation, the device housing 102 may be a frame that other components of the head-mounted device 100 are connected to. In some implementations, the device housing 102 may be an enclosed structure such that certain components of the head-mounted device 100 are contained within the device housing 102 and thereby protected from damage. In some implementations, the device housing 102 may be an eyeglasses style frame.

The facial interface 104 is associated with the device housing 102 and is configured to contact the head 108 of the user. As examples, the facial interface 104 may be connected to the device housing 102, the facial interface 104 may be formed on the device housing 102 (e.g., as a coating) or the facial interface 104 may be defined by features that are formed integrally on the device housing 102. The facial interface 104 may be located at areas around a periphery of the device housing 102 where contact with the user's face is likely.

The facial interface 104 functions to conform to portions of the user's face to allow the headband 106 to be tensioned to an extent that will restrain motion of the device housing 102 with respect to the user's head. The facial interface 104 may also function to reduce an amount of light from the physical environment around the user that reaches the user's eyes. The facial interface 104 may contact areas of the user's face, such as the user's forehead, temples, and cheeks. The facial interface 104 may be formed from a compressible material, such as open-cell foam or closed cell foam.

The headband 106 is connected to the device housing 102. The headband 106 is a component or collection of components that function to secure the device housing 102 in place with respect to the user's head so that the device housing 102 is restrained from moving with respect to the head 108 of the user and maintains a comfortable position during use. In some implementations, the headband 106 is rigid. In some implementations, the headband 106 is flexible. In some implementations, the headband 106 includes one or more rigid portions and one or more flexible portions.

The headband 106 extends from a first end 210 to a second end 211. The headband 106 is configured to extends around the head 108 of the user from the first lateral side 212 of the device housing 102 to the second lateral side 213 of the device housing 102 and extends around the head 108 of the user to secure the device housing 102 and to restrain motion of the device housing 102 relative to the head 108 of the user. The first end 210 of the headband 106 is connected to the first lateral side 212 (e.g., a left side) of the device housing 102. The second end 211 of the headband 106 is connected to the second lateral side 213 (e.g., a right side) of the device housing 102.

As best seen in FIG. 3, the facial interface 104 includes an upper portion 314 and a lower portion 315. The upper portion 314 and the lower portion 315 are configured so that they will be positioned above and below the user's eyes, respectively, when the head-mounted device 100 is worn by the user (e.g., as represented by the positions of lenses in FIG. 3). The upper portion 314 and the lower portion 315 may each extend all or part way across the lateral width of the device housing 102, and may each extend from the first lateral side 212 to the second lateral side 213 of the device housing 102. Thus, the upper portion 314 of the facial interface 104 may engage the forehead of the user and the lower portion 315 of the facial interface 104 may engage the nose and/or cheeks of the user.

The headband 106 is configured to apply a moment to the device housing 102 in a direction that urges the upper portion 314 of the facial interface 104 toward a head of user so that a first loading that is applied to the head of the user by the upper portion 314 of the facial interface 104 is higher than a second loading that is applied to the head 108 of the user by the lower portion 315 of the facial interface 104. It should be noted that contrary moments will be applied to the device housing 102 in typical implementations, for example, as a result of the self-weight of the device housing 102 and its included components. Thus, a magnitude of the second loading that is applied to the head 108 of the user by the lower portion 315 of the facial interface 104 will typically be positive, but lower than the magnitude of the first loading that is applied to the head 108 of the user by the upper portion 314 of the facial interface 104.

Figure 4:
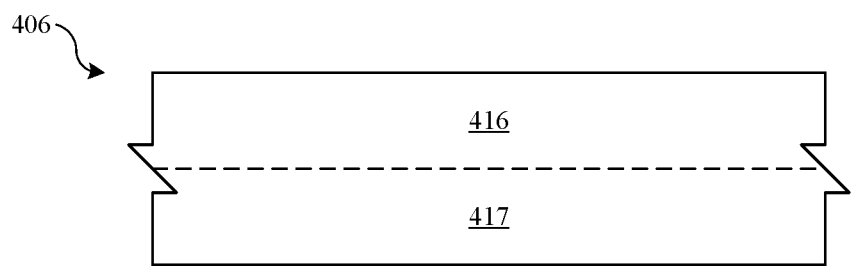
FIG. 4 is a side view detail that shows a first part of the headband of FIGS. 1-3 according to a first example.

FIG. 4 is a side view detail showing a first part 406 of the headband 106 according to a first example. The headband 106 includes an upper headband portion 416 and a lower headband portion 417. The first part 406 of the headband 106 is elastic and flexible, which makes the first part 406 of the headband 106 movable between an unstretched condition and a stretched condition. Other parts of the headband 106 may have the same structure as the first part 406, or may be configured differently (e.g., uniform top-to-bottom, rigid, etc.). The upper headband portion 416 and the lower headband portion 417 are each formed from a flexible and elastic material. The upper headband portion 416 has a lower elasticity (higher resistance to stretching) then the lower headband portion 417. As a result, more force is carried by the upper headband portion 416 than by the lower headband portion 417 when the first part 406 of the headband 106 is stretched from the unstretched condition to the stretched condition because more force is required to stretch the upper headband portion 416 by the same amount as the lower headband portion 417.

As one example, the upper headband portion 416 and the lower headband portion 417 may be formed from different elastic materials that have differing elasticities. In such an embodiment, the upper headband portion 416 and the lower headband portion 417 may be a one-piece structure fabricated to achieve the desired elastic properties, or the upper headband portion 416 and the lower headband portion 417 may be formed as two separate pieces that are connected to each other or are not connected to each other.

In the illustrated example, the upper headband portion 416 extends from a top edge of the first part 406 of the headband 106 to an interface with the lower headband portion 417, which extends upward from a bottom edge of the first part 406 of the headband 106. The upper headband portion 416 and the lower headband portion 417 are shown as each defining approximately half of the vertical height of the first part 406 of the headband 106, but the location of the interface may be adjusted to change the magnitude of the moment applied to the device housing 102 of the head-mounted device 100.

Figure 5:
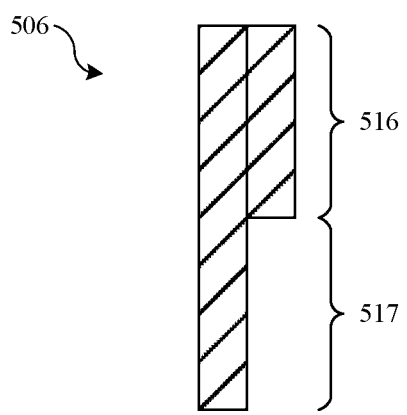
FIG. 5 is a side view detail that shows a first part of the headband of FIGS. 1-3 according to a second example.

FIG. 5 is a side view detail showing a first part 506 of the headband 106 according to a second example. The first part 506 is similar to the first part 406 except that the elasticity of a material used for an upper headband portion 516 is the same as the elasticity of the material used for a lower headband portion 517. The upper headband portion 516 includes a larger cross-sectional area of the flexible and elastic material, which is implemented in this example by placing two layers of the flexible and elastic material side-by-side while the lower headband portion 517 has only a single layer of the flexible and elastic material. Stated differently, the upper headband portion 516 has a greater cross-sectional area per unit height than the lower headband portion 517. The result is that the upper headband portion 516 has a lower elasticity (higher resistance to stretching) then the lower headband portion 517 because of the larger cross-sectional area. As a result, more force is carried by the upper headband portion 416 than by the lower headband portion 417 when the first part 406 of the headband 106 is stretched from the unstretched condition to the stretched condition because more force is required to stretch the upper headband portion 516 by the same amount as the lower headband portion 517.

Figure 6:
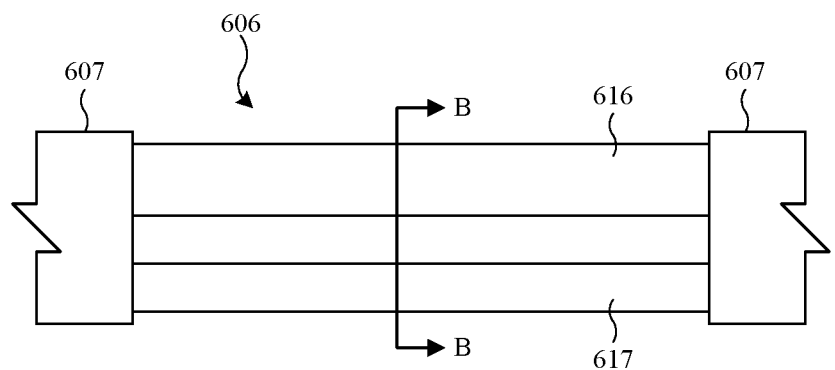
FIG. 6 is a side view detail that shows a first part of the headband of FIGS. 1-3 according to a third example.
Figure 7:
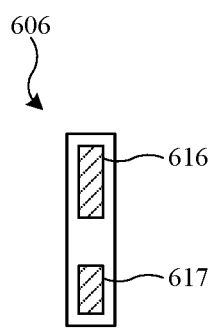
FIG. 7 is a cross-section view taken along line B-B of FIG. 6 showing the first part of the headband according to the third example.

FIG. 6 is a side view detail showing a first part 606 of the headband 106 according to a third example. FIG. 7 is a cross-section view taken along line B-B of FIG. 6 showing the first part 606 of the headband 106 according to the third example. The first part 606 is similar to the first part 406 except that an upper headband portion 616 and a lower headband portion 617 are separate structures (e.g., an upper band and a lower band or a first band and a second band). The upper headband portion 616 and the lower headband portion 617 are formed from a flexible elastic material. In the illustrated example, the upper headband portion 616 and the lower headband portion 617 each extend between rigid headband structures 607, but the upper headband portion 616 and the lower headband portion 617 can be incorporated in the headband 106 according to other configurations.

The upper headband portion 616 and the lower headband portion 617 may be formed from the same material and have different elasticities as a result of different cross-sectional areas (e.g., the upper headband portion 616 has a larger cross-sectional area than the lower headband portion 617), so that the upper headband portion 616 has a lower elasticity (e.g., higher resistance to stretching) than the lower headband portion 617, which has a relatively higher elasticity (e.g., lower resistance to stretching).

The upper headband portion 616 may include a larger cross-sectional area of the flexible and elastic material relative to the lower headband portion 617, which is implemented in this example by placing two layers of the flexible and elastic material side-by-side while the lower headband portion 617 has only a single layer of the flexible and elastic material. The result is that the upper headband portion 616 has a lower elasticity (higher resistance to stretching) then the lower headband portion 617. As a result, more force is carried by the upper headband portion 416 than by the lower headband portion 417 when the first part 406 of the headband 106 is stretched from the unstretched condition to the stretched condition because more force is required to stretch the upper headband portion 616 by the same amount as the lower headband portion 617.

Figure 8:
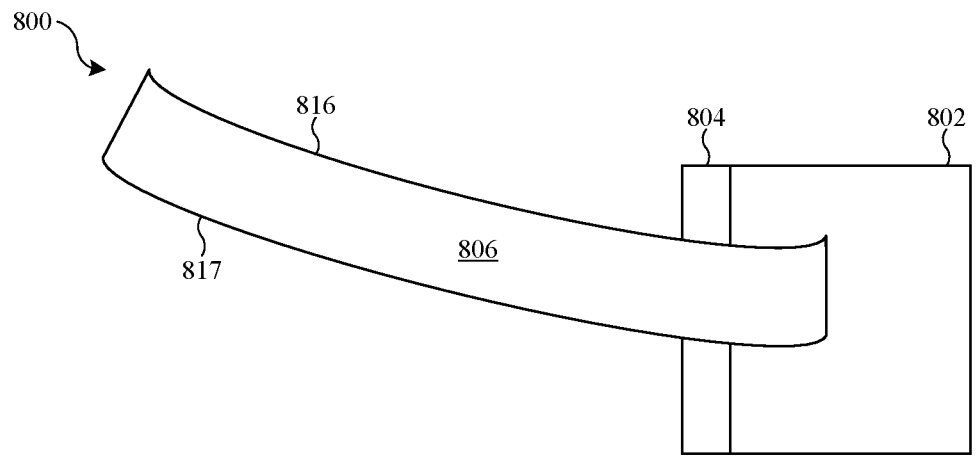
FIG. 8 is a side view illustration that shows a head-mounted device including a headband according to a fourth example in an unstretched condition.
Figure 9:
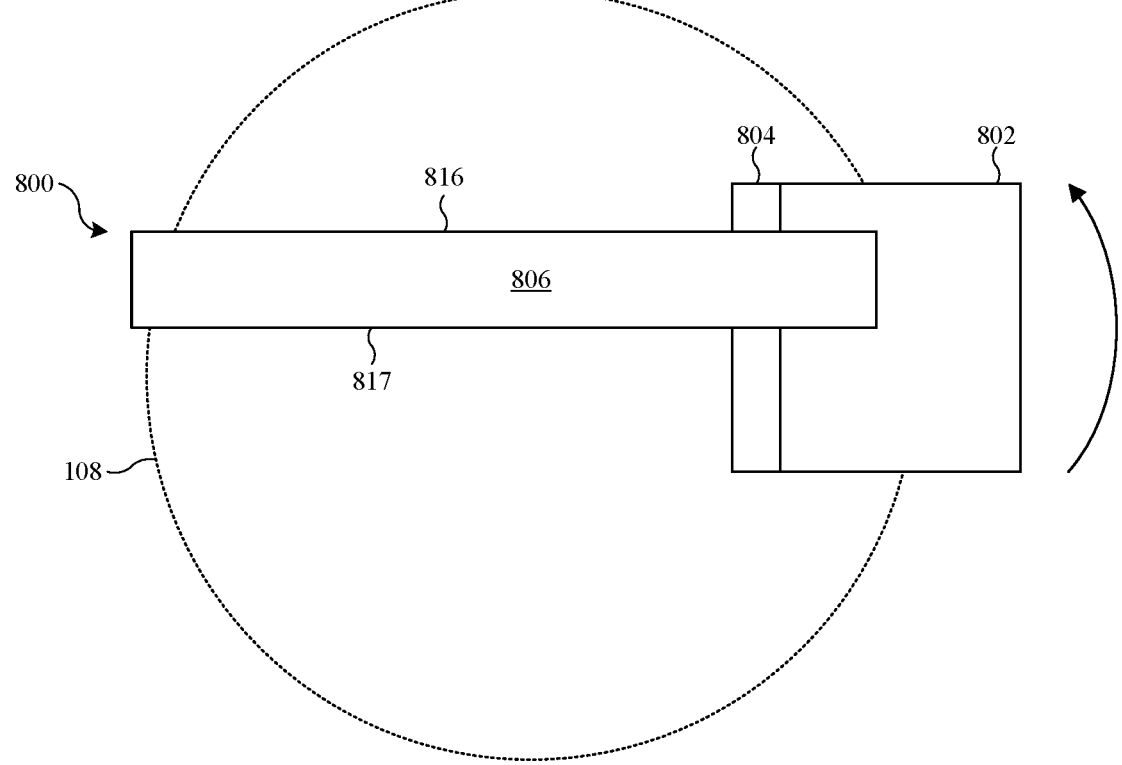
FIG. 9 is a side view illustration that shows the head-mounted device of FIG. 8 including the headband according to the fourth example in a stretched condition.

FIG. 8 is a side view illustration that shows a head-mounted device 800 including a headband 806 according to a fourth example in an unstretched condition. FIG. 9 is a side view illustration that shows the head-mounted device 800 including the headband 806 in a stretched condition. A device housing 802, a facial interface 804, and the headband 806 of the head-mounted device 800 are similar to like-named components except as otherwise stated herein.

The headband 806 is movable between the unstretched condition (FIG. 8) and the stretched condition (FIG. 9). Part of the headband 806 of all of the headband 806 is curved as viewed from the side when the headband 806 is in the unstretched condition, and at least part of the headband 806 (inclusive of the portion that is curved) is formed from a flexible and elastic material. In the unstretched condition, an upper headband portion 816 (e.g., an upper edge and/or a portion adjacent to the upper edge) of the headband 806 has a length that is shorter than a length of a lower headband portion 817 (e.g., a lower edge and/or a portion adjacent to the lower edge) of the headband 806. The curvature of the headband 806 can result from, for example, molding the flexible and elastic material into the curved shape when the headband 806 (or the curved portion thereof) is formed. As examples, the flexible and elastic material may be or include synthetic rubber or silicone rubber.

The headband 806 is curved in the unstretched condition so that the upper headband portion 816 of the headband 806 stretches (e.g., increases in length) by a first amount in a stretched condition relative to the unstretched condition and the lower headband portion 817 of the headband 806 stretches (e.g., increases in length) by a second amount in the stretched condition relative to the unstretched condition, wherein the first amount is greater than the second amount. Because the upper headband portion 816 stretches more than the lower headband portion 817, more tension is developed in the upper headband portion 816 as compared to the lower headband portion 817, which applies the moment to the device housing 802 as and loads the facial interface 804 in the manner previously described with respect to the device housing 802 and the facial interface 804. In the stretched condition, a length difference between the upper headband portion 816 and the lower headband portion 817 is decreased relative to the unstretched condition, and the lengths of the upper headband portion 816 and the lower headband portion 817 may be substantially the same.

Figure 10:
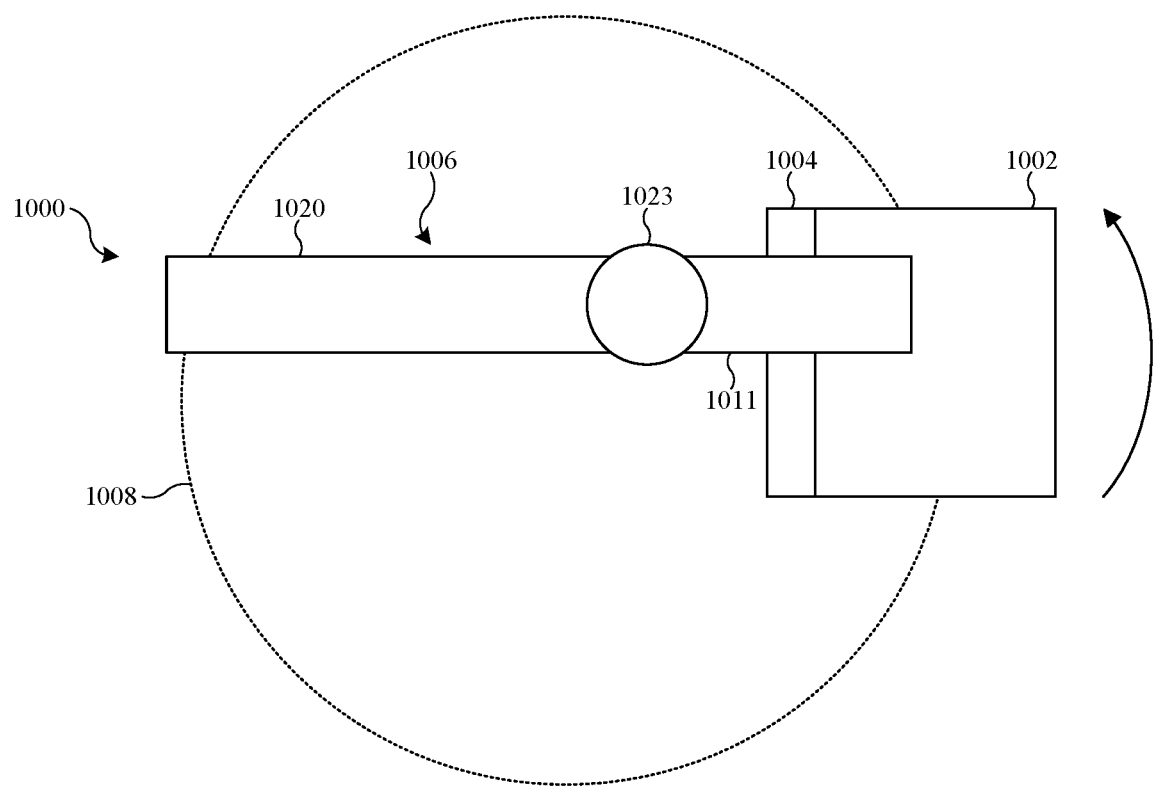
FIG. 10 is a side view illustration that shows a head-mounted device including a headband according to a fifth example.
Figure 11:
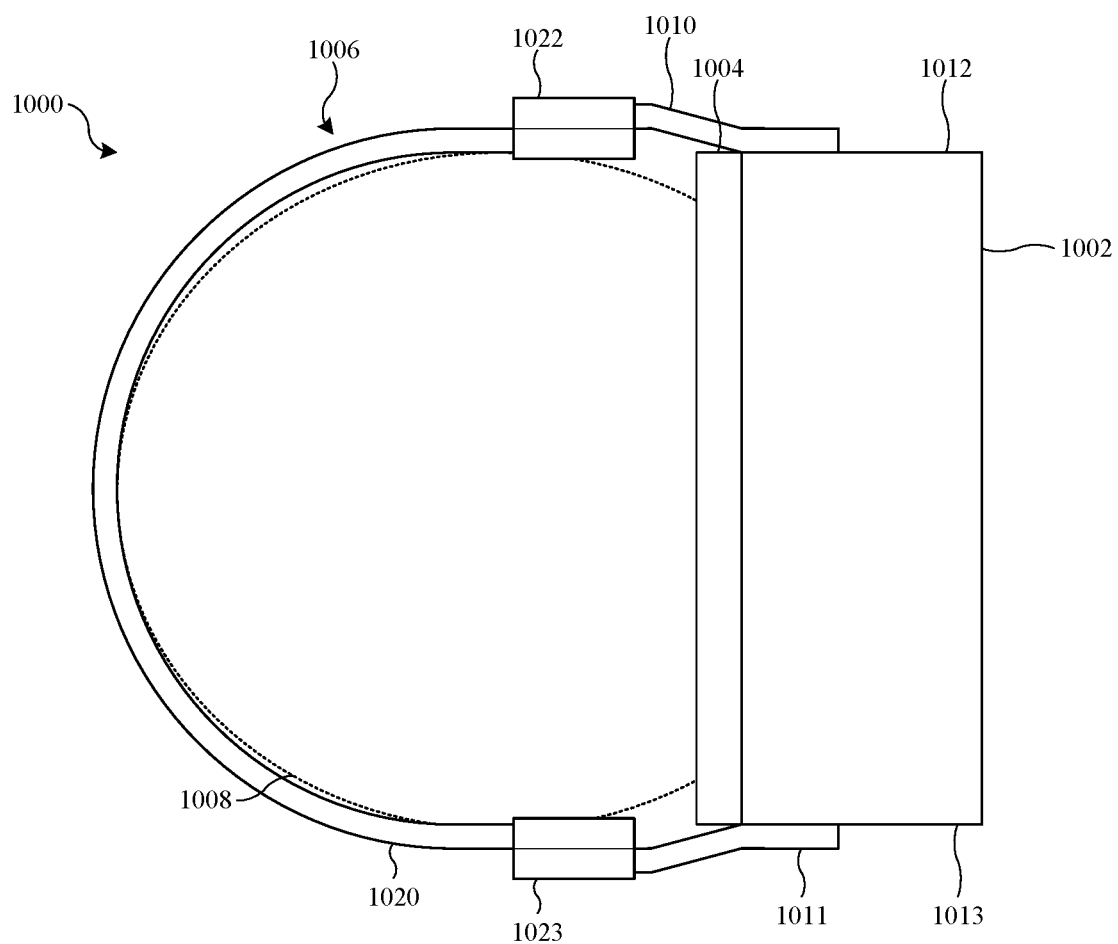
FIG. 11 is a top view illustration that shows the head-mounted device of FIG. 10 including the headband according to the fifth example.

FIG. 10 is a side view illustration that shows a head-mounted device 1000 including a headband 1006 according to a fifth example. FIG. 11 is a top view illustration that shows the head-mounted device 1000 including the headband 1006.

The head-mounted device 1000 is configured to be worn on a head 1008 of a user and includes a device housing 1002, a facial interface 1004, the headband and 1006, all of which are consistent with the description of the head-mounted device 100 and its components, except as described herein.

The headband 1006 includes a central portion 1020, a first end portion 1010, and a second end portion 1011. The first end portion 1010 is connected to a first lateral side 1012 of the device housing 1002. The second end portion 1011 is connected to a second lateral side 1013 of the device housing 1002.

In some implementations, at least part of the headband 1006 may be flexible and elastic. As one example, at least part of the central portion 1020 of the headband 1006 may be flexible and elastic to stretch when worn by the user, while the first end portion 1010 and the second end portion 1011 may be formed from substantially rigid materials that resist flexing and/or stretching between the device housing 1002, the first pivot joint 1022 and the second pivot joint 1023, respectively. In this example, the first end portion 1010 of the headband 1006 may be rigidly connected to the first lateral side 1012 of the device housing 1002 and the second end portion 1011 of the headband 1006 may be rigidly connected to the second lateral side 1013 of the device housing 1002. These rigid connections may prevent motion of the first end portion 1010 of the headband 1006 and the second end portion 1011 of the headband 1006 with respect to the device housing 1002.

In some implementations, the central portion 1020, the first end portion 1010, and the second end portion 1011 of the headband 1006 are all substantially rigid structures.

In some implementations, the headband 1006 includes a structure that allows for size adjustment. As an example, one or more telescoping sections may be incorporated in the central portion 1020, the first end portion 1010, and/or the second end portion 1011 of the headband. In such an implementation, the central portion 1020, the first end portion 1010, and the second end portion 1011 may be substantially rigid or may be flexible and elastic.

The headband 1006 is configured to apply a moment to the device housing 1002 in a direction that urges an upper portion of the facial interface 1004 toward a head of user so that a first loading that is applied to the head of the user by the upper portion of the facial interface 1004 is higher than a second loading that is applied to the head 1008 of the user by a lower portion of the facial interface 1004, as explained with respect to the headband 106 of the head-mounted device 100.

The headband 1006 includes a first pivot joint 1022 and a second pivot joint 1023 that apply the moment to the device housing 1002 through the first end portion 1010 and the second end portion 1011 of the headband 1006. The first pivot joint 1022 connects the central portion 1020 of the headband 1006 to the first end portion 1010 of the headband 1006. The headband 1006 includes a second pivot joint 1023 that connects the central portion 1020 to the first end portion 1010. The first pivot joint 1022 of the headband 1006 is located near the first lateral side 1012 of the device housing 1002 and is connected to the first lateral side 1012 of the device housing 1002 by the first end portion 1010 of the headband 1006. The second pivot joint 1023 of the headband 1006 is located near the second lateral side 1013 of the device housing 1002 and is connected to the second lateral side 1013 of the device housing 1002 by the second end portion 1011 of the headband 1006.

Figure 12:
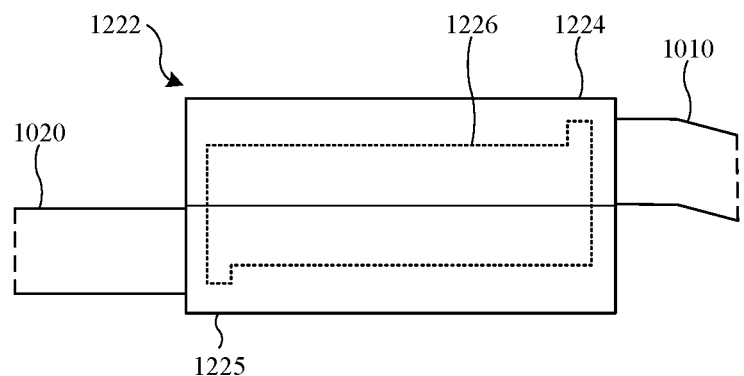
FIG. 12 is a detail view showing an example implementation of a pivot joint of the head-mounted device of FIG. 10.

FIG. 12 is a detail view showing a first implementation of a first pivot joint 1222 that can be used as the first pivot joint 1022 and the second pivot joint 1023 of the of the head-mounted device of FIG. 10. In the illustrated example, the first pivot joint 1222 is connected to the first end portion 1010 of the headband 1006 of the head-mounted device 1000 and to the central portion 1020 of the headband 1006 (which may be referred to as, for example, first and second portions of the headband).

The first pivot joint 1222 includes a first housing part 1224 and a second housing part 1225. The first housing part 1224 has a fixed connection to the first end portion 1010 of the headband 1006 and the second housing part 1225 has a fixed connection to the central portion 1020 of the headband 1006.

The first housing part 1224 is pivotally connected to the second housing part 1225 to allow relative rotation of the first housing part 1224 and the second housing part 1225 and thereby define the first pivot joint 1222. The first housing part 1224 and the second housing part 1225 may be connected to each other so that they rotate on an axis that is oriented laterally and passes through each of the first housing part 1224 and the second housing part 1225. A number of structures can be used to define the pivotal connection of the first housing part 1224 and the second housing part 1225 such as an axle, one or more pins that follow one or more tracks, and one or more annular projections (e.g., extending axially or radially) that are disponed in one or more annular slots (e.g., extending annularly or radially).

The first pivot joint 1222 is a spring-biased joint. The first housing part 1224 may be connected to the second housing part 1225 in a manner that urges relative rotation of the first housing part 1224 and the second housing part 1225 by applying torque between the first housing part 1224 and the second housing part 1225. In the illustrated implementation, a spring 1226 is connected to and/or in engagement with the first housing part 1224 and the second housing part 1225. As an example, the spring 1226 may be a torsion spring that has a first end that is connected to the first housing part 1224 and has a second end that is connected to the second housing part 1225. By inducing relative rotation of the first housing part 1224 and the second housing part 1225, the spring 1226 causes the first pivot joint to apply the moment to the device housing 1002, as previously described.

According to foregoing, the first pivot joint 1222 may incorporated in the headband 1006 of the head-mounted device 1000 in place of the first pivot joint 1022 and the second pivot joint 1023 to define a device having a headband that includes a first pivot joint near a first lateral side of a device housing and a second pivot joint near a second lateral side of the device housing, wherein the first pivot joint and the second pivot joint are spring-biased to apply a moment to the device housing.

In some implementations, the first pivot joint 1222 may include detents that correspond to particular angular positions of the first housing part 1224 with respect to the second housing part 1225. The detents define detent positions for the first pivot joint 1222 in which the moment is not applied to the device housing 102.

In some implementations, the first pivot joint may include a user operable button that is connected to a clutch or similar mechanical element. When depressed (or otherwise operated by the user), the user operable button releases the spring biasing of first pivot joint 1222 between the first housing part and the second housing part 1225 to allow for free motion of the first pivot joint 1222.

Figure 13:
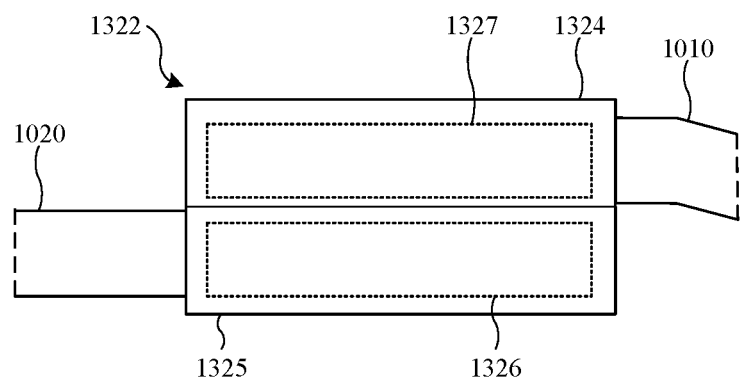
FIG. 13 is a detail view that shows an example implementation of a pivot joint of the head-mounted device of FIG. 10.

FIG. 13 is a detail view showing a second implementation of a first pivot joint 1322 that can be used as the first pivot joint 1022 and the second pivot joint 1023 of the of the head-mounted device of FIG. 10. In the illustrated example, the first pivot joint 1322 is connected to the first end portion 1010 of the headband 1006 of the head-mounted device 1000 and to the central portion 1020 of the headband 1006 (which may be referred to as, for example, first and second portions of the headband).

The first pivot joint 1322 includes a first housing part 1324 and a second housing part 1325. The first housing part 1324 has a fixed connection to the first end portion 1010 of the headband 1006 and the second housing part 1325 has a fixed connection to the central portion 1020 of the headband 1006. The first housing part 1324 and the second housing part 1325 may be connected to each other so that they rotate on an axis that is oriented laterally and passes through each of the first housing part 1324 and the second housing part 1325.

The first pivot joint 1322 is a spring-biased joint that includes a spring 1326.

The first pivot joint 1322 is also configured to lock out the biasing force of the spring and to allow relative sliding of the first housing part 1324 and the second housing part 1325 using a guide plate 1327 that controls relative motion of the first housing part 1324 and the second housing part 1325. Thus, the first housing part 1324 is pivotally connected to the second housing part 1325 to allow relative rotation of the first housing part 1324 and the second housing part 1325 and thereby define the first pivot joint 1322, and the first housing part 1324 is also able to slide with respect to the second housing part 1325.

The first pivot joint 1322 is a spring-biased joint. The first housing part 1324 may be connected to the second housing part 1325 in a manner that urges relative rotation of the first housing part 1324 and the second housing part 1325 by applying torque between the first housing part 1324 and the second housing part 1325. In the illustrated implementation, a spring 1326 is connected to and/or in engagement with the first housing part 1324 and the second housing part 1325 through the guide plate 1327. By inducing relative rotation of the first housing part 1324 and the second housing part 1325, the spring 1326 causes the first pivot joint to apply the moment to the device housing 1002, as previously described.

Figure 14:
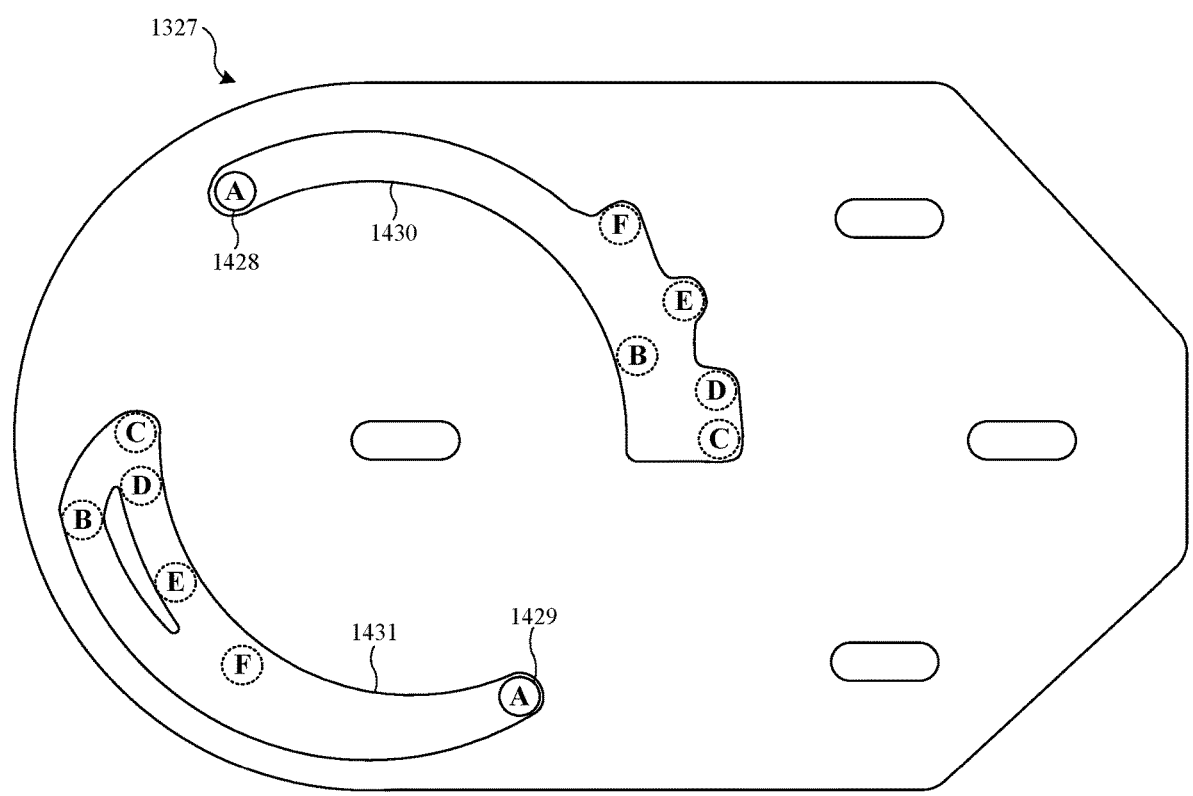
FIG. 14 is an illustration that shows a guide plate of the pivot joint of FIG. 13.

FIG. 14 is an illustration that shows the guide plate 1327 of the first pivot joint 1322. The guide plate 1327 is engaged by a first pin 1428 and a second pin 1429, through which the spring 1326 is related to the guide plate 1327 for biasing of the first housing part 1324 with respect to the second housing part 1325. The first pin 1428 is in engagement with a first guide feature 1430 that is formed on the guide plate 1327 and the second pin 1429 is in engagement with a second guide feature 1431 that is formed on the guide plate 1327. The first guide feature 1430 and the second guide feature 1431 are structural features having a geometric configuration that can be engaged by the first pin 1428 and the second pin 1429 to guide motion of the first housing part 1324 with respect to the second housing part 1325. As an example, the first guide feature 1430 and the second guide feature 1431 may each be slots or depressions, and the first pin 1428 and the second pin 1429 engage outer walls or other portions of the slots or depressions (in a cam/cam follower relationship) to guide motion and establish detent positions for the first housing part 1324 with respect to the second housing part 1325.

In the illustrated example, the first guide feature 1430 establishes detent positions at specific angular orientations of the first housing part 1324 with respect to the second housing part 1325 and the second guide feature 1431 causes and/or allows sliding of the first housing part 1324 with respect to the second housing part 1325 in dependence on the angular orientation of the first housing part 1324 with respect to the second housing part 1325. As the first housing part 1324 is rotated with respect to the second housing part 1325, the first pin 1428 and the second pin 1429 move in unison with respect to the guide plate 1327 through positions designated as A, B, C, D, E, and F with respect to the first guide feature 1430 and the second guide feature 1431. In the illustrated example, positions A and C correspond to first and second end limits of travel, while positions D, E, and F correspond to angular detent positions according to the geometric configuration of the first guide feature 1430. Sliding motion is caused, for example, between positions B and C, for example, according to the geometric configuration of the second guide feature 1431.

In some implementations, the first pivot joint 1322 may include a user-operable mechanism (e.g., operated by a button or a lever) that disengages the spring 1326 so that it does not apply a biasing force between the first housing part 1324 and the second housing part 1325. As an example, the user-operable mechanism may disengage the first pin 1428 and the second pin 1429 from the guide plate 1327, such as by shifting the guide plate 1327 laterally. While the spring 1326 is disengaged, the moment is no longer applied to the device housing 1002.

According to foregoing, the first pivot joint 1322 may incorporated in the headband 1006 of the head-mounted device 1000 in place of the first pivot joint 1022 and the second pivot joint 1023 to define a device having a headband that includes a first pivot joint near a first lateral side of a device housing and a second pivot joint near a second lateral side of the device housing, wherein the first pivot joint and the second pivot joint are spring-biased to apply a moment to the device housing, the first pivot joint and the second pivot joint each include a guide plate, the guide plate defines one or more detent positions that resist biasing, and the guide plate allows sliding motion at the joint by sliding of a first housing part with respect to a second housing part.

Figure 15:
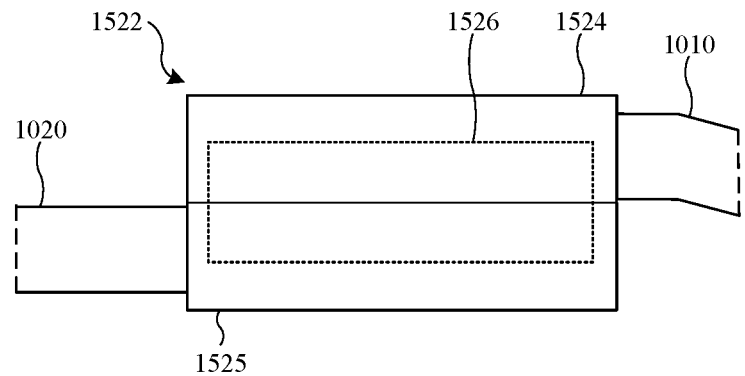
FIG. 15 is a detail view that shows an example implementation of a pivot joint of the head-mounted device of FIG. 10.

FIG. 15 is a detail view showing a third implementation of a first pivot joint 1522 that can be used as the first pivot joint 1022 and the second pivot joint 1023 of the of the head-mounted device of FIG. 10. In the illustrated example, the first pivot joint 1522 is connected to the first end portion 1010 of the headband 1006 of the head-mounted device 1000 and to the central portion 1020 of the headband 1006 (which may be referred to as, for example, first and second portions of the headband).

The first pivot joint 1522 includes a first housing part 1524 and a second housing part 1525. The first housing part 1524 has a fixed connection to the first end portion 1010 of the headband 1006 and the second housing part 1525 has a fixed connection to the central portion 1020 of the headband 1006.

The first housing part 1524 is pivotally connected to the second housing part 1525 to allow relative rotation of the first housing part 1524 and the second housing part 1525 and thereby define the first pivot joint 1522. The first housing part 1524 and the second housing part 1525 may be connected to each other so that they rotate on an axis that is oriented laterally and passes through each of the first housing part 1524 and the second housing part 1525. A number of structures can be used to define the pivotal connection of the first housing part 1524 and the second housing part 1525 such as an axle, one or more pins that follow one or more tracks, and one or more annular projections (e.g., extending axially or radially) that are disponed in one or more annular slots (e.g., extending annularly or radially).

The first pivot joint 1522 includes an electronic actuator 1526 that is configured to and controllable to apply torque between the first housing part 1524 and the second housing part 1525, and to induce relative rotation of the first housing part 1524 and the second housing part 1525. The electronic actuator 1526 is connected to and/or in engagement with the first housing part 1524 and the second housing part 1525. As one example, the electronic actuator 1526 may be an electronic motor that is connected to and/or in engagement with the first housing part 1524 and the second housing part 1525. As another example, the electronic actuator may be or include electromagnetic components that are operable to apply torque between and/or induce rotation of the first housing part 1524 with respect to the second housing part 1525. As another example, the electronic actuator 1526 may be or include one or more solenoids are operable to apply torque between and/or induce rotation of the first housing part 1524 with respect to the second housing part 1525.

According to foregoing, the first pivot joint 1522 may incorporated in the headband 1006 of the head-mounted device 1000 in place of the first pivot joint 1022 and the second pivot joint 1023 to define a device having a headband that includes a first pivot joint near a first lateral side of a device housing and a second pivot joint near a second lateral side of the device housing, wherein the first pivot joint and the second pivot joint each include an electronic actuator to apply a moment to the device housing.

In some implementations, the electronic actuator 1526 is controlled according to a sensed value that corresponds to the magnitude of the moment that is applied to the device housing 1002. As one example, the sensed value can be a tension value measured by a sensor that is incorporated in the headband 1006 (e.g., in the first end portion 1010, the second end portion 1011, and/or the central portion 1020). As another example, sensors (e.g., strain gauges) can be incorporated in the headband 1006, with a first sensor such as a first strain gauge near a top edge of the headband 1006 and a second sensor such as a second strain gauge near a bottom edge of the headband 1006.

In some implementations, user preferences can be set to control the amount of torque applied by the electronic actuator 1526. In some implementations, the user preferences can be used to set an angle for the first pivot joint 1522 and move the joint to the specified angular orientation using the electronic actuator 1526. In some implementations, the amount of torque that is applied by the electronic actuator 1526 can be modulated according to content that is output by the head-mounted device 1000. In some implementations, the electronic actuator 1526 can modulate torque and/or motion to apply active feedback.

Figure 16:
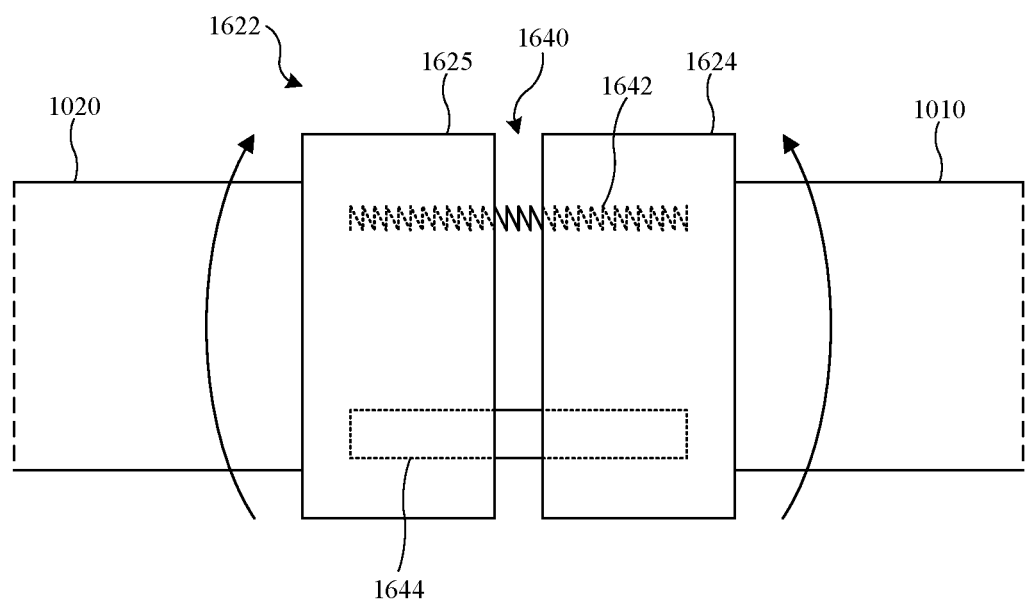
FIG. 16 is a side detail view that shows an example implementation of a pivot joint of the head-mounted device of FIG. 10.
Figure 17:
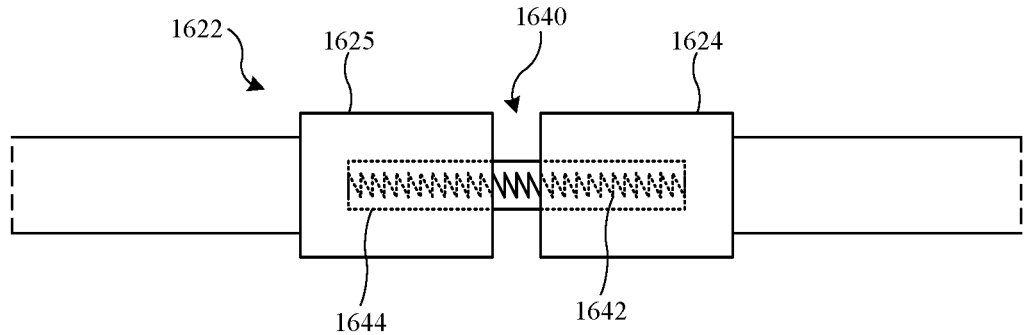
FIG. 17 is a top detail view that shows the pivot joint of FIG. 16.

FIG. 16 is a side detail view and FIG. 17 is a top detail view showing a fourth implementation of a first pivot joint 1622 that can be used as the first pivot joint 1022 and the second pivot joint 1023 of the of the head-mounted device of FIG. 10. In the illustrated example, the first pivot joint 1622 is connected to the first end portion 1010 of the headband 1006 of the head-mounted device 1000 and to the central portion 1020 of the headband 1006 (which may be referred to as, for example, first and second portions of the headband).

The first pivot joint 1622 includes a first housing part 1624 and a second housing part 1625. The first housing part 1624 has a fixed connection to the first end portion 1010 of the headband 1006 and the second housing part 1625 has a fixed connection to the central portion 1020 of the headband 1006. The first housing part 1624 and the second housing part 1625 are arranged so that the first housing part 1624 is positioned longitudinally forward relative to the second housing part 1625 and the second housing part 1625 is positioned longitudinally rearward relative to the first housing part 1624. A gap 1640 may be present longitudinally between the first housing part 1624 and the second housing part 1625 to allow relative rotation of the first housing part 1624 and the second housing part 1625.

The first pivot joint 1622 may be a spring-biased joint including structures that urge relative rotation of the first housing part 1624 and the second housing part such that the top ends of the first housing part 1624 and the second housing part 1625 are urged toward each other and the bottom ends of the first housing part 1624 and the second housing part 1625 are urged away from each other. This arrangement applies the moment to the device housing 1002 as previously described.

The first pivot joint 1622 includes a biasing structure 1642 to urge relative rotation of the first housing part 1624 and the second housing part 1625. The first pivot joint 1622 also include a connecting structure 1644 that is connected to the first housing part 1624 and to the second housing part 1625 and defines a rotation point for the first pivot joint 1622.

In the illustrated implementation, the biasing structure 1642 is a tension spring that is connected to the first housing part 1624 and the second housing part 1625 to urge an upper end of the first housing part 1624 toward an upper end of the second housing part 1625. The biasing structure 1642 may be located near upper ends of the first housing part 1624 and the second housing part 1625. As one example, the biasing structure 1642 may be located above the connecting structure 1644. As another example, the biasing structure 1642 may be located above a vertical midline of the first housing part 1624 and the second housing part 1625.

In alternative implementations, the biasing structure 1642 may be a compression spring that is connected to the first housing part 1624 and the second housing part 1625 to urge a lower end of the first housing part 1624 away from a lower end of the second housing part 1625, with the biasing structure 1642 being located below the connecting structure 1644 and/or below a vertical midline of the first housing part 1624 and the second housing part 1625. In some implementations, multiple biasing structures may be included in the first pivot joint 1622.

The connecting structure 1644 functions to connect the first housing part 1624 to the second housing part 1625 in a manner that allows relative rotation of the first housing part 1624 and the second housing part 1625. Rigid or flexible structures may be used. As one example, the connecting structure 1644 may be a pin or axle that is rotatable with respect to one of or both of the first housing part 1624 and the second housing part 1625. As another example, the connecting structure 1644 may be a pin that is fixed to one of the first housing part 1624 and the second housing part 1625 and is rotatably and slidably connected to the other of the first housing part 1624 and the second housing part 1625, such as by disposition in a track that guides the pin with respect to the other of the first housing part 1624 or the second housing part 1625.

Accordingly, the first housing part 1624 may be connected to the second housing part 1625 in a manner that urges relative rotation of the first housing part 1624 and the second housing part 1625. By inducing relative rotation of the first housing part 1624 and the second housing part 1625, the biasing structure 1642 causes the first pivot joint to apply the moment to the device housing 1002, as previously described.

In some implementations, the structure of the first pivot joint 1622 may be incorporated in a head-mounted device having a first pivot joint and a second pivot joint, wherein the first pivot joint and the second pivot joint each include a first housing part, a second housing part, a biasing structure, and a connecting structure. In such implementations, the first housing part is positioned longitudinally forward relative to the second housing part, the biasing structure is configured to urge relative rotation of the first housing part and the second housing part, and the connecting structure defines a rotation point for the first pivot joint.

Figure 18:
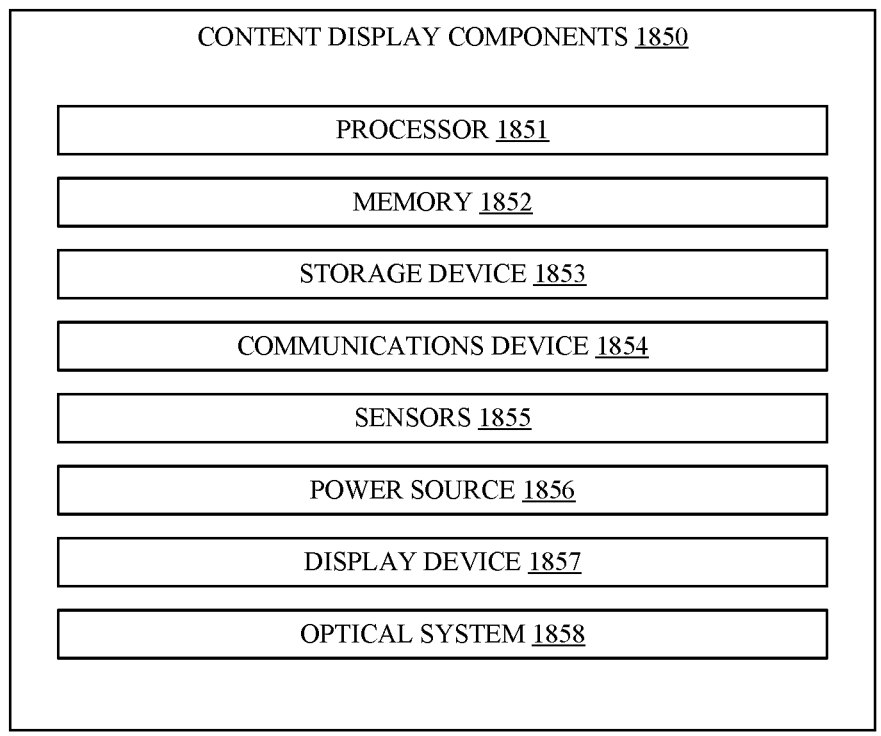
FIG. 18 is a block diagram that shows an example of electronic components that can be included in the head-mounted devices that are described herein.

FIG. 18 is a block diagram that shows an example of content display components 1850 that can be included in the head-mounted devices that are described herein, such as the head-mounted device 100 and the head-mounted device 1000. The content display components 1850 include electronic components and optical components that may be included in the head-mounted devices that are described herein to display content. As an example, the content display components 1850 may include electronic components that are connected to a device housing and optical components that are connected to a device housing, wherein the electronic components and the optical components cooperate to display the content to the user.

In this example, the optical components that are incorporated in content display components 1850 include a processor 1851

The processor 1851 is a device that is operable to execute computer program instructions and is operable to perform operations that are described by the computer program instructions. The processor 1851 may be implemented using one or more conventional devices and/or more or more special-purpose devices. As examples, the processor 1851 may be implemented using one or more central processing units, one or more graphics processing units, one or more application specific integrated circuits, and/or one or more field programmable gate arrays. The processor 1851 may be provided with computer-executable instructions that cause the processor 1851 to perform specific functions. The memory 1852 may be one or more volatile, high-speed, short-term information storage devices such as random-access memory modules.

The storage device 1853 is intended to allow for long term storage of computer program instructions and other data. Examples of suitable devices for use as the storage device 1853 include non-volatile information storage devices of various types, such as a flash memory module, a hard drive, or a solid-state drive.

The communications device 1854 supports wired or wireless communications with other devices. Any suitable wired or wireless communications protocol may be used.

The sensors 1855 are components that are incorporated in the head-mounted device to generate sensor output signals to are used as inputs by the processor 1851 for use in generating CGR content and controlling tension, as will be described herein. The sensors 1855 include components that facilitate motion tracking (e.g., head tracking and optionally handheld controller tracking in six degrees of freedom). The sensors 1855 may also include additional sensors that are used by the device to generate and/or enhance the user's experience in any way. The sensors 1855 may include conventional components such as cameras, infrared cameras, infrared emitters, depth cameras, structured-light sensing devices, accelerometers, gyroscopes, and magnetometers.

The sensors 1855 may also include biometric sensors that are operable to physical or physiological features of a person, for example, for use in user identification and authorization. Biometric sensors may include fingerprint scanners, retinal scanners, and face scanners (e.g., two-dimensional and three-dimensional scanning components operable to obtain image and/or three-dimensional surface representations). Other types of devices can be incorporated in the sensors 1855. The information that is generated by the sensors 1855 is provided to other components of the head-mounted device, such as the processor 1851, as inputs.

The power source 1856 supplies electrical power to components of the head-mounted device. In some implementations, the power source 1856 is a wired connection to electrical power. In some implementations, the power source 1856 may include a battery of any suitable type, such as a rechargeable battery. In implementations that include a battery, the head-mounted device may include components that facilitate wired or wireless recharging.

The display device 1857 is connected to the device housing and functions to display content to the user in the form of emitted light that is output by the display device 1857 and is directed toward the user's eyes by the optical system 1858. The display device 1857 is a light-emitting display device, such as a video display of any suitable type, that is able to output images in response to a signal that is received from the processor 1851. The display device 1857 may be of the type that selectively illuminates individual display elements according to a color and intensity in accordance with pixel values from an image. As examples, the display device may be implemented using a liquid-crystal display (LCD) device, a light-emitting diode (LED) display device, a liquid crystal on silicon (LCoS) display device, an organic light-emitting diode (OLED) display device, or any other suitable type of display device. The display device 1857 may include multiple individual display devices (e.g., two display screens or other display devices arranged side-by-side in correspondence to the user's left eye and the user's right eye).

The optical system 1858 is associated with the display device 1857 and is optically coupled to the display device 1857. The optical system is connected to the device housing such that portions of the optical system 1858 (e.g., lenses) are positioned adjacent to the user's eyes. The optical system 1858 directs the emitted light from the display device 1857 to the user's eyes. In some implementations, the optical system 1858 may be configured isolate the emitted light from environment light (e.g., as in a virtual reality type system), so that a scene perceived by the user is defined only by the emitted light and not by the environment light. In some implementations, the optical system 1858 may be configured to combine the emitted light with environmental light so that the scene perceived by the user is defined by the emitted light and the environment light. In some implementations, the optical system 1858 may combine the emitted light and the environment light so that a spatial correspondence is established between the emitted light and the environmental light to define the scene that is perceived by the user (e.g., as in an augmented reality type system). The optical system 1858 may include lenses, reflectors, polarizers, filters, optical combiners, and/or other optical components.

In some implementations of the head-mounted device, some or all of these components may be included in a separate device that is removable. For example, any or all of the processor 1851, the memory 1852, and/or the storage device 1853, the communications device 1854, the sensors 1855, the power source 1856, and the display device 1857 may be incorporated in a device such as a smart phone that is connected (e.g., by docking) to the other portions of the head-mounted device.

In some implementations of the head-mounted device, the processor 1851, the memory 1852, and/or the storage device 1853 are omitted, and the corresponding functions are performed by an external device that communicates with the head-mounted device. In such an implementation, the head-mounted device may include components that support a data transfer connection with the external device using a wired connection or a wireless connection that is established using the communications device 1854.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR Include Virtual Reality and Mixed Reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of Mixed Realities Include Augmented Reality and Augmented Virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for use during operation of a head-mounted device. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores fit and comfort related information that allows the head-mounted device to be actively adjusted for a user. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile to adjustment of a head-mounted device, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, fit and comfort related parameters may be determined each time the head-mounted device is used, such as by scanning a user's face as they place the device on their head, and without subsequently storing the information or associating with the particular user.

What is claimed is:

1. A head-mounted device that is configured to display content to a user, comprising:
    a device housing that has a first lateral side and a second lateral side;
    a facial interface that is associated with the device housing and is configured to contact a head of the user, wherein the facial interface has an upper portion and a lower portion; and
    a headband that is connected to the first lateral side and the second lateral side of the device housing and extends around a head of the user to support the device housing with respect to the user,
    wherein the headband includes an upper headband portion and a lower headband portion, wherein the upper headband portion extends from a top edge of the headband toward the lower headband portion, and the lower headband portion extends from a bottom edge of the headband toward the upper headband portion,
    wherein the upper headband portion and the lower headband portion are formed from different elastic materials, and the different elastic materials cause the headband to apply a moment to the device housing in a direction that urges the upper portion of the facial interface toward a head of user so that a first loading that is applied to the head of the user by the upper portion of the facial interface is higher than a second loading that is applied to the head of the user by the lower portion of the facial interface.

2. The head-mounted device of claim 1, wherein at least part of the headband is elastic and flexible, is movable between an unstretched condition and a stretched condition, and includes an upper headband portion and a lower headband portion, wherein the upper headband portion has a lower elasticity than the lower headband portion.

3. The head-mounted device of claim 1, wherein the headband includes a first pivot joint near the first lateral side of the device housing and a second pivot joint near the second lateral side of the device housing, wherein the first pivot joint and the second pivot joint are spring-biased to apply the moment to the device housing.

4. The head-mounted device of claim 1, further comprising:
    electronic components that are connected to the device housing and optical components that are connected to the device housing, wherein the electronic components and the optical components cooperate to display the content to the user.

5. The head-mounted device of claim 1, wherein the upper headband portion and the lower headband portion are formed as two separate pieces that are connected to each other.

6. The head-mounted device of claim 1, wherein the upper headband portion and the lower headband portion are formed as two separate pieces that are not connected to each other.

7. The head-mounted device of claim 1, wherein the upper headband portion and the lower headband portion each define approximately half of a vertical height of the headband.

8. The head-mounted device of claim 1, wherein a magnitude of a non-zero moment applied by the headband portion to the device housing is based on a location of an interface between the upper headband portion and the lower headband portion.

9. A head-mounted device that is configured to display content to a user, comprising:
    a device housing that has a first lateral side and a second lateral side;
    a facial interface that is associated with the device housing, is configured to contact a head of the user, and has an upper portion and a lower portion; and
    a headband that is connected to the first lateral side and the second lateral side of the device housing and extends around a head of the user to support the device housing with respect to the user,
    wherein the headband is connected to the device housing at a location that is below the upper portion of the facial interface and above the lower portion of the facial interface and includes an upper headband portion that is elastic and flexible that is located above a lower headband portion that is elastic and flexible,
    wherein the upper headband portion and the lower headband portion are each connected to the first lateral side and the second lateral side of the device housing,
    wherein the upper headband portion has a lower elasticity than the lower headband portion and the difference in elasticities between the upper headband portion and the lower headband portion causes a first loading that is applied to the head of the user by the upper portion of the facial interface to be higher than a second loading that is applied to the head of the user by the lower portion of the facial interface.

10. The head-mounted device of claim 9, wherein the upper headband portion and the lower headband portion are included in a one-piece structure.

11. The head-mounted device of claim 9, wherein the upper headband portion and the lower headband portion are separate structures.

12. The head-mounted device of claim 9, wherein the upper headband portion and the lower headband portion are movable between an unstretched condition and a stretched condition.

13. The head-mounted device of claim 9, further comprising:
    electronic components that are connected to the device housing and optical components that are connected to the device housing, wherein the electronic components and the optical components cooperate to display the content to the user.

14. A head-mounted device that is configured to display content to a user, comprising:
- a device housing that has a first lateral side and a second lateral side; and
- a headband that includes a central portion, a first end portion, a second end portion, a first pivot joint, and a second pivot joint, the first end portion is connected to the first lateral side of the device housing and to the first pivot joint, the second end portion is connected to the second lateral side of the device housing and to the second pivot joint, and the central portion is connected to the first pivot joint and the second pivot joint,
- wherein the first pivot joint is configured to induce relative rotation between the first end portion of the headband and the central portion of the headband so the first end portion of the headband and the central portion of the headband rotate upward and toward each other, and
- wherein the second pivot joint is configured to induce relative rotation between the second end portion of the headband and the central portion of the headband so the second end portion of the headband and the central portion of the headband rotate upward and toward each other.

15. The head-mounted device of claim 14, further comprising:
- a facial interface that is associated with the device housing and is configured to contact a head of the user,
- wherein the facial interface has an upper portion and a lower portion and a first loading that is applied to the head of the user by the upper portion of the facial interface is higher than a second loading that is applied to the head of the user by the lower portion of the facial interface.

16. The head-mounted device of claim 14, wherein the first pivot joint and the second pivot joint are spring-biased.

17. The head-mounted device of claim 14, further comprising:
- electronic components that are connected to the device housing and optical components that are connected to the device housing, wherein the electronic components and the optical components cooperate to display the content to the user.

18. The head-mounted device of claim 14, wherein the first pivot joint includes a detent that corresponds to an angular position in which the moment is not applied to the device housing.

19. The head-mounted device of claim 14, wherein the first pivot joint includes a user operable button that, when depressed, is configured to allow the first pivot joint to move freely.

* * * * *